(12) United States Patent
Dorn

(10) Patent No.: US 11,044,989 B2
(45) Date of Patent: Jun. 29, 2021

(54) ITEM OF FURNITURE

(71) Applicant: ERWIN HYMER GROUP SE, Bad Waldsee (DE)

(72) Inventor: Guenter Dorn, Schlier (DE)

(73) Assignee: Erwin Hymer Group SE, Bad Waldsee (DE)

(*) Notice: Subject to any disclaimer, the term of this patent is extended or adjusted under 35 U.S.C. 154(b) by 0 days.

(21) Appl. No.: 16/279,134

(22) Filed: Feb. 19, 2019

(65) Prior Publication Data

US 2019/0174912 A1 Jun. 13, 2019

Related U.S. Application Data

(63) Continuation of application No. PCT/EP2018/051955, filed on Jan. 26, 2018.

(30) Foreign Application Priority Data

Jan. 27, 2017 (DE) .................... 10 2017 101 617.1
May 17, 2017 (DE) .................... 10 2017 110 675.8

(51) Int. Cl.
| | |
|---|---|
| A47B 3/10 | (2006.01) |
| B60N 3/00 | (2006.01) |
| A47B 3/00 | (2006.01) |
| A47C 17/82 | (2006.01) |
| B62D 33/06 | (2006.01) |

(52) U.S. Cl.
CPC ................ *A47B 3/10* (2013.01); *A47B 3/00* (2013.01); *A47C 17/82* (2013.01); *B60N 3/001* (2013.01); *A47B 2200/008* (2013.01); *B62D 33/0612* (2013.01)

(58) Field of Classification Search
CPC .......... B60N 30/00; B60N 3/001; B60N 3/10; B60N 3/103; B60N 3/106; A47B 3/10; A47B 3/00; A47B 2200/008
USPC ................... 296/164, 26.01–26.15, 156–176
See application file for complete search history.

(56) References Cited

U.S. PATENT DOCUMENTS

| | | | | |
|---|---|---|---|---|
| 4,047,773 A | * | 9/1977 | Semany | ............. A47B 87/0292 312/111 |
| 5,031,563 A | | 7/1991 | Matre | |
| 7,000,978 B1 | * | 2/2006 | Messano | ............. B62D 29/001 296/181.6 |
| 2016/0040825 A1 | * | 2/2016 | Franklin | ................ F16M 11/14 439/39 |
| 2016/0375836 A1 | * | 12/2016 | Bathelier | ................. B60R 7/02 296/24.4 |

FOREIGN PATENT DOCUMENTS

| | | |
|---|---|---|
| CH | 7 06 185 B1 | 9/2013 |
| CN | 202514914 U | 11/2012 |

(Continued)

OTHER PUBLICATIONS

International Search Report and Written Opinion (Application No. PCT/EP2018/051955) dated Mar. 5, 2018.

*Primary Examiner* — Dennis H Pedder
(74) *Attorney, Agent, or Firm* — Burr & Brown, PLLC

(57) ABSTRACT

An item of furniture is provided, including lateral elements defining a carcass, at least one of a top element and a bottom element, and at least one securing mechanism having magnetic properties and adapted to secure the item of furniture to a floor element or a wall element.

9 Claims, 4 Drawing Sheets

(56) References Cited

FOREIGN PATENT DOCUMENTS

| | | |
|---|---|---|
| CN | 202728244 U | 2/2013 |
| DE | 7313052 U | 7/1973 |
| DE | 25 54 348 | 6/1977 |
| DE | 10 2008 025 449 B3 | 12/2009 |
| DE | 20 2008 017 599 U1 | 7/2010 |
| DE | 10 2015 107 939 A1 | 8/2016 |
| EP | 2085535 * | 1/2009 |
| WO | 2017/143335 A1 | 8/2017 |

* cited by examiner

ITEM OF FURNITURE

CROSS REFERENCE TO RELATED APPLICATIONS

This application is a continuation of International Application No. PCT/EP2018/051955 filed Jan. 26, 2018, which designated the United States, and claims the benefit under 35 USC § 119(a)-(d) of German Application No. 10 2017 101 617.1 filed Jan. 27, 2017 and German Application No. 10 2017 110 675.8 filed May 17, 2017, the entireties of which are incorporated herein by reference.

FIELD OF THE INVENTION

The present invention relates to an item of furniture as well as a camper.

BACKGROUND OF THE INVENTION

Tables and items of furniture are quite familiar from the prior art. Among others, one is familiar, for example, from CH 007 06 185 B1, with a table which is outfitted with magnets, by means of which a table top can be arranged seemingly floating above table legs.

It may prove to be a problem in some instances that tables might be moved unintentionally by external influences for lack of an adequate securing. This problem likewise applies to items of furniture.

In the sense of the present invention, the term item of furniture encompasses, for example, cabinets, dressers, beds, chairs, benches, etc.

It is sometimes even possible for external influences to cause the tables or items of furniture to be toppled. This may present a substantial risk of injury to persons in the immediate vicinity. An unintentional movement of tables may furthermore have the consequence of damaging articles arranged on tables or in items of furniture.

Especially in the field of recreational vehicles there is an increased risk of unintentional movement of tables or furniture, especially during travel.

It may furthermore be of advantage to flexibly rearrange the table or furniture layouts in vehicles. For example, vehicles are known which allow arrangements of furniture and tables on rails in the floor. However, a somewhat inflexible grid pattern is specified in this case.

SUMMARY OF THE INVENTION

The problem which the present invention proposes to solve is to provide an item of furniture in which an unintentional movement of the item of furniture can be prevented by simple means.

As the solution of the problem, an item of furniture is proposed, comprising lateral elements which form a carcass, a top element and/or bottom element or a seat base. According to the present invention, it is provided that the item of furniture comprises at least one securing mechanism for securing the item of furniture to a bottom element or a wall element, wherein the securing mechanism has magnetic properties.

In addition or alternatively, it may also be provided that the item of furniture may be secured to a ceiling section. Accordingly, a wall element may also be viewed as a ceiling section. A ceiling section may be viewed as being a roof section of a vehicle, for example.

It is thus possible to ensure a firm purchase of the item of furniture thanks to magnetically active forces, when so required.

In one modification of the present invention, it may be provided that the securing mechanism is arranged in the carcass and can preferably be connected to a bottom element. In this way, the outer appearance of the item of furniture is not impaired by the securing mechanism.

In one modification of the item of furniture, it is provided that the securing mechanism can be switched on and off by means of a current source as well as at least one activating mechanism and is arranged in the carcass and can preferably be connected to a bottom element. In this way, an activating with very little effort as well as an easy handling of the securing mechanism is made possible. Furthermore, thanks to the arrangement of the securing mechanism in the carcass, any needed wiring expense is reduced. An arrangement near the floor furthermore makes possible a secure purchase or fastening of the item of furniture by the securing mechanism. Furthermore, thanks to such an arrangement near the floor, stowage space in the carcass may be used for other purposes.

In an especially advantageous embodiment of the present invention, it may be provided that the at least one securing mechanism is designed as an electromagnet, or at least comprises an electromagnet.

By means of an electromagnet, the holding and/or loosening of the item of furniture, such as a table or the support member of the table, can be done individually by a user.

In an especially advantageous embodiment of the present invention, it may be provided that the at least one securing mechanism comprises at least one permanent magnet. Thus, with simple means, a stable securing of the item of furniture, for example, to a correspondingly magnetic or magnetizable surface can be achieved. In particular, in this case no outside energy source is needed in a purely mechanical solution.

In a further advantageous embodiment of the present invention, it may be provided that the at least one securing mechanism comprises at least one arrangement of at least one permanent magnet and at least one magnetizable material, wherein preferably a relative movement can be performed between permanent magnet and magnetizable material.

In this way, the securing mechanism can have a movable design, so that an especially easy holding or loosening of the item of furniture can be made possible. Furthermore, it is advantageous that the securing mechanism can have a compact design and in particular also be operated with no current or by using low voltage. Properly chosen magnetizable material allows the magnetic forces of the permanent magnet to be strengthened or weakened in its field effect.

In combination with an electromechanically produced relative movement, it is furthermore possible by means of brief electric pulses to deactivate the holding of the item of furniture, or to reactivate the holding by means of a new pulse.

An especially efficient and simple design of a securing mechanism can be configured such that the securing mechanism comprises at least one electromagnet and at least one permanent magnet.

A further embodiment of an especially efficient securing mechanism may provide that the securing mechanism comprises at least one electromagnet and at least one permanent magnet, wherein a relative movement can be performed between permanent magnet and electromagnet.

An especially efficient securing mechanism may furthermore be provided in that the securing mechanism comprises at least one electromagnet, at least one permanent magnet, and at least one magnetizable material, especially a diamagnetic or ferromagnetic material.

It may also be provided that relative movements can be performed between permanent magnet and/or electromagnet and/or magnetizable material.

Thanks to the suitable combination of the aforementioned magnetic or magnetically active holding means, the required holding force for the particular application can be accomplished or adjusted in a flexible manner. The available structural space or the usable contact surface for the securing can also influence the choice and the design of the holding means.

In one modification of the present invention, it may be provided that the item of furniture is designed as a table, comprising at least one support member, especially a table leg or the like, and at least one table top, wherein the at least one support member has an upper end and a lower end and wherein the support member is connected at the upper end to the table top, wherein the support member comprises the securing mechanism, which is arranged on a lower end of the support member and has magnetic properties.

It is thus possible to ensure a holding of the table or of the support member of the table as needed thanks to magnetically active forces. Magnetic means represent simple design embodiments for this.

In a further advantageous embodiment of the present invention, it may be provided that the at least one support member has a cavity at least for a portion and the at least one securing mechanism is arranged in the cavity.

Such an arrangement of the securing mechanism can enable a shielding of the securing mechanism and unintentional influencing of other objects. Furthermore, an arrangement of the securing mechanism in a cavity enables a protecting of the securing mechanism, e.g., against damage. Finally, an arrangement in a cavity can make possible an especially stable holding of the support member or the table.

The present invention may provide that the securing mechanism can be switched on and off by means of a current source as well as at least one activating mechanism.

This represents a simple possibility of securing the table or the support member or a loosening of a securing as needed. Also very little effort is required for this, so that an easy handling is made possible.

In one modification of the present invention, it may be provided that the current source is arranged in the support member.

In particular, it is provided that the current source is arranged in the table foot.

This represents a possible way of arranging a current source near a securing mechanism and thus reducing the wiring expense. Such an arrangement of a current source may also be protected against external influences, e.g., external mechanical forces.

In one modification, it may be provided that the activating mechanism is arranged on the table top and is connected in particular to the table top.

Thus, the table or the support member can be fastened to or loosened from a securing as needed, wherein such an arrangement of the activating mechanism makes possible easy accessibility. It can also be ensured that the activating mechanism cannot be activated unintentionally, so that the table or the support member of the table cannot be unintentionally secured or loosened.

In one advantageous modification of the present invention, it may be provided that the lower end of the support member has a contact surface, wherein the contact surface is formed by a magnet, especially an electromagnet, or is magnetizable by the magnet, especially the electromagnet.

It is thus possible to ensure a holding of the table or the support member of the table as needed thanks to magnetically acting forces. Magnetic means represent simple design embodiments here. By means of an electromagnet, the holding and/or loosening of the table or the support member of the table is individually possible by a user. A contact surface can make possible an especially stable securing of the table or the support member of the table.

It may be provided that the support member comprises sections which are movable, such that the table is height-adjustable.

The table may thus be adapted to individual needs.

It may also be provided that a connection member preferably configured as a frame is arranged between table top and support member.

Thus, a stable connection between table top and support member can be provided.

It is also possible for the table top to comprise at least one current-carrying connecting member.

This may be connected, for example, to an electrical device, so that the table has a broader range of possible uses.

In the sense of the present invention, the table top may also be viewed as a seat base. Thus, the table in the sense of the invention may also be used, e.g., as a chair or the like for sitting. This may be illustrated furthermore by a lowering of the table top to seat height.

A securing mechanism which is arranged in a carcass can be protected against damage by such an arrangement and at the same time enable a securing holding of the item of furniture.

In the sense of the present invention, a seat base and/or reclining surface may also be viewed as a carcass. A chair leg may also be viewed as a carcass in the sense of the present invention.

The present invention furthermore relates to a camper, mobile home or similar travel or recreational vehicle, comprising a living area and/or a bathroom area with a floor as well as at least one item of furniture arranged in the living area and/or in the bathroom area.

Furthermore, the present invention may also find use in multiperson vehicles or the like, such as minibuses or spacious limousines to provide a flexible interior design. This may be used, e.g., for a vehicle in which a flexible conversation situation needs to be provided during travel.

It is essential to the present invention that the item of furniture comprises at least one securing mechanism, having magnetic properties, and the floor in at least one partial area has at least one metallic surface, wherein the item of furniture can be secured magnetically to the floor in releasable manner.

It is thus possible to ensure a holding of the table or the item of furniture by magnetically acting forces as needed. Magnetic means represent simple design embodiments here. The risk of injury by unintentional movement of the table or the item of furniture, e.g. during travel, can be reduced.

The present invention may also provide that, in a camper, mobile home or similar travel or recreational vehicle, the metallic surface is configured as a magnetically active rail or as a plate element which is set into the floor, preferably being integrated inconspicuously or covered by a floor covering. In this way, damage to the magnetic surface can be avoided.

The present invention may also provide that the item of furniture is designed as a table.

BRIEF DESCRIPTION OF THE DRAWINGS

The present invention shall be described more closely in the following with the aid of drawings.

DETAILED DESCRIPTION OF THE INVENTION

Figure 1:
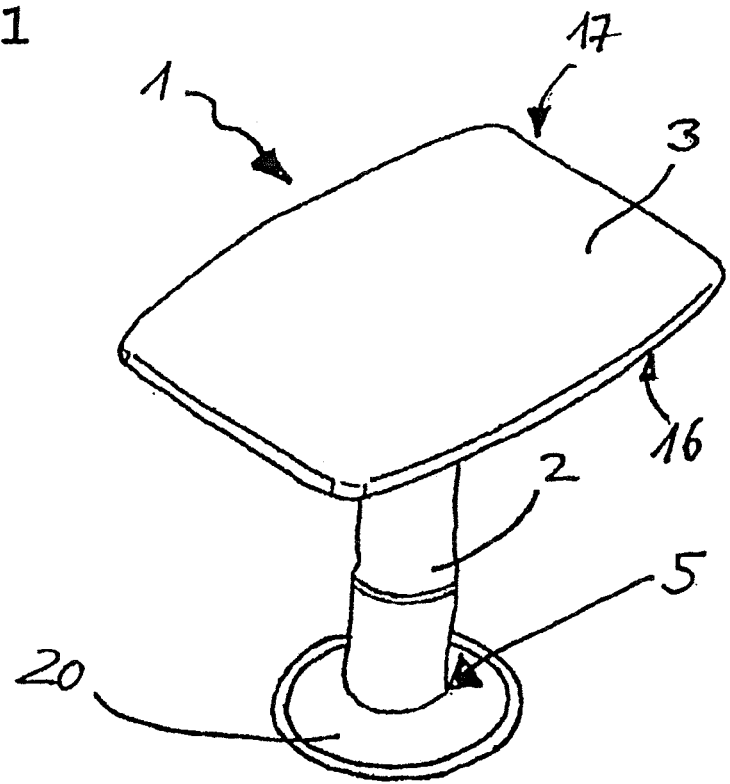
FIG. 1 is a schematic representation of a table according to the present invention.

FIG. 1 shows a schematic representation of a table 1. The table 1 comprises a support member 2 and a table top 3.

The table top 3 has a bottom side 16 and a top side 17.

The support member 2 is configured as a table leg and comprises an upper end 4 and a lower end 5. The support member 2 is connected at the upper end 4 to the table top 3. In a manner not otherwise shown, the support member 2 comprises at least one securing mechanism, which is arranged at the lower end 5 of the support member 2 and has magnetic properties.

Figure 2:
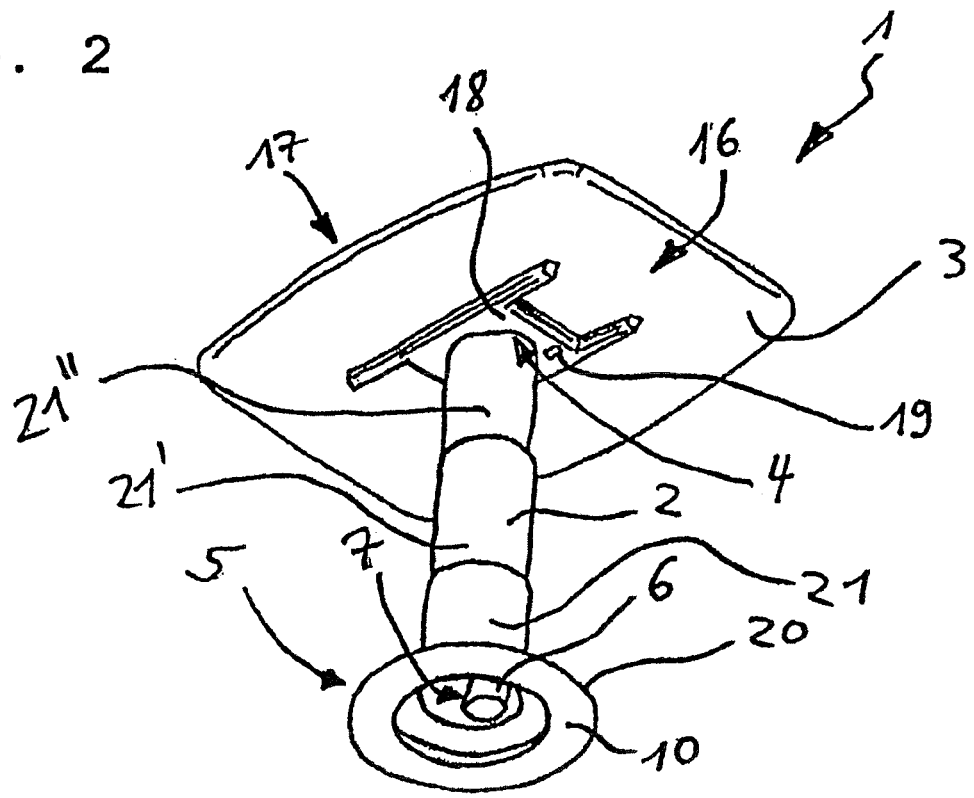
FIG. 2 is a schematic representation of the table shown in FIG. 1 in a bottom view.

The present invention may also provide, in particular, that the support member 2 can be connected to the table top 3 via a frame or similar connection member, for example (see FIG. 2).

In the exemplary embodiment shown, the support member 2 comprises a base 20, which can make possible an increased bearing surface of the table 1 and thus at the same time an increased positional stability of the table 1. In the exemplary embodiment, the base 20 is arranged directly at the lower end 5 of the support member 2.

The table 1 shown in FIG. 1 can also be seen as a so-called bistro table, having only one support member 2.

However, the present invention also explicitly relates to tables having more than one support member, especially four support members.

FIG. 2 shows a schematic representation of an exemplary embodiment of a table 1 according to the present invention in a bottom view. In the exemplary embodiment shown, the table top 3 is joined by a frame 18 to the support member 2.

Furthermore, it is shown that the frame 18 comprises a charging device 19, with which a current source formed as a storage battery, for example, (not shown here, see e.g. FIG. 4) can be charged.

It may also be provided that the charging device 19 can be provided and accordingly configured for the charging of other electronic devices not otherwise shown here, such as portable telephones or similar means of communication.

The support member 2 comprises a cavity 7, in which a securing mechanism 6 is arranged.

Thus, the support member 2 comprises at least one securing mechanism 6, which is arranged at a lower end 5 of the support member 2. The securing mechanism 6 has magnetic properties.

The table 1 can consequently be secured by magnetic forces by means of the support member 2, which comprises a securing mechanism 6, to or on a not otherwise represented floor or a ground surface.

Therefore, a strengthened purchase of the table 1 on a correspondingly magnetized ground surface or a correspondingly magnetized floor (not shown here) is made possible.

It is also shown that the lower end 5 of the support member 2 has a contact surface 10. It can be provided that the contact surface 10 is formed by a magnet, especially an electromagnet, or is magnetizable by a magnet, especially an electromagnet.

Such a magnet or electromagnet can also be construed as a ring magnet, for example.

It may also be provided that the contact surface 10 is magnetizable by the securing mechanism 6. Thus, the contact surface 10 may also be construed as a securing mechanism.

Figure 3:
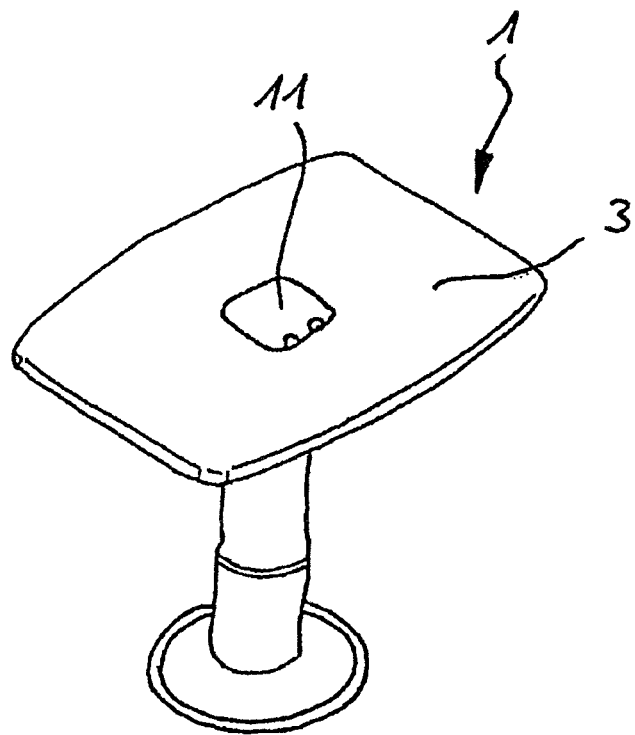
FIG. 3 is a schematic representation of another exemplary embodiment of a table according to the present invention.

FIG. 3 shows a further embodiment of a table 1 according to the present invention. The table top 3 comprises a covering means for at least one connecting member not otherwise shown here (see FIG. 4).

Figure 4:
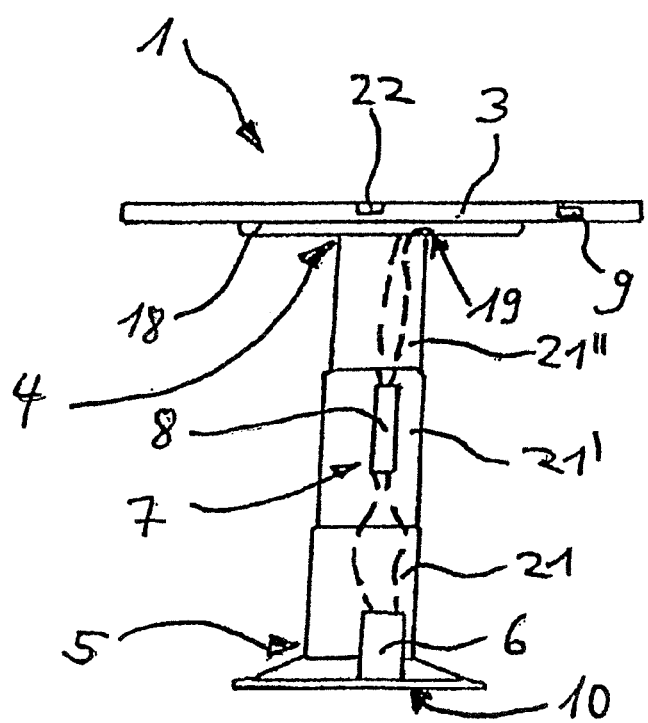
FIG. 4 is a schematic representation of the table of FIG. 1 in a side view.

FIG. 4 shows a schematic representation of the table 1 (also see FIG. 1) in a side view. It is shown that the support member 2 comprises a cavity 7 at least for a portion and the securing mechanism 6 is arranged in the cavity 7.

Furthermore, an activating mechanism 9 is represented. It is shown that the activating mechanism 9 is arranged on the table top 3 and in particular is connected to the table top 3. It may be provided that the securing mechanism 6 can be switched on and off by means of a current source 8 and at least one activating mechanism 9. For this, it may be provided that the securing mechanism 6 is designed as an electromagnet.

The activating mechanism 9 can also be arranged elsewhere on the table.

In the exemplary embodiment, it is shown that the current source 8 is arranged in the support member 2. Preferably, the current source 8 is designed as a storage battery.

It is furthermore shown that the support member 2 comprises sections 21, 21', 21" which are movable such that the table 1 is height-adjustable.

Figure 5:
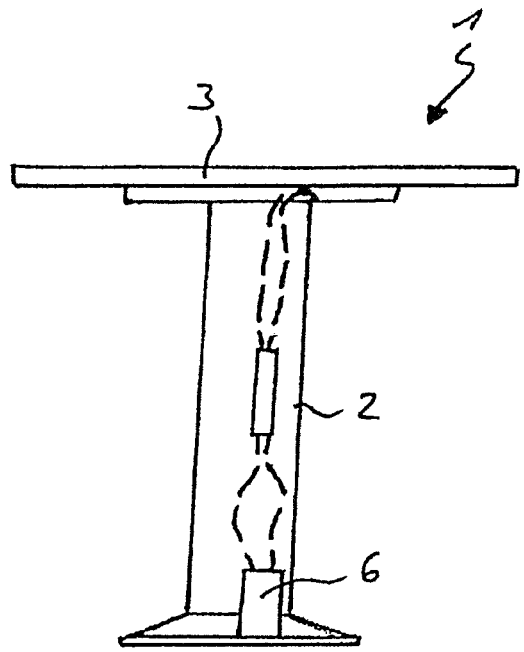
FIG. 5 is a schematic representation of another exemplary embodiment of a table according to the present invention in a side view.

It may also be provided that the support member 2 is designed as a rigid support member 2 (see FIG. 5). Accordingly, it may be provided that the support member 2 or the table 1 is not height-adjustable.

Figure 6:
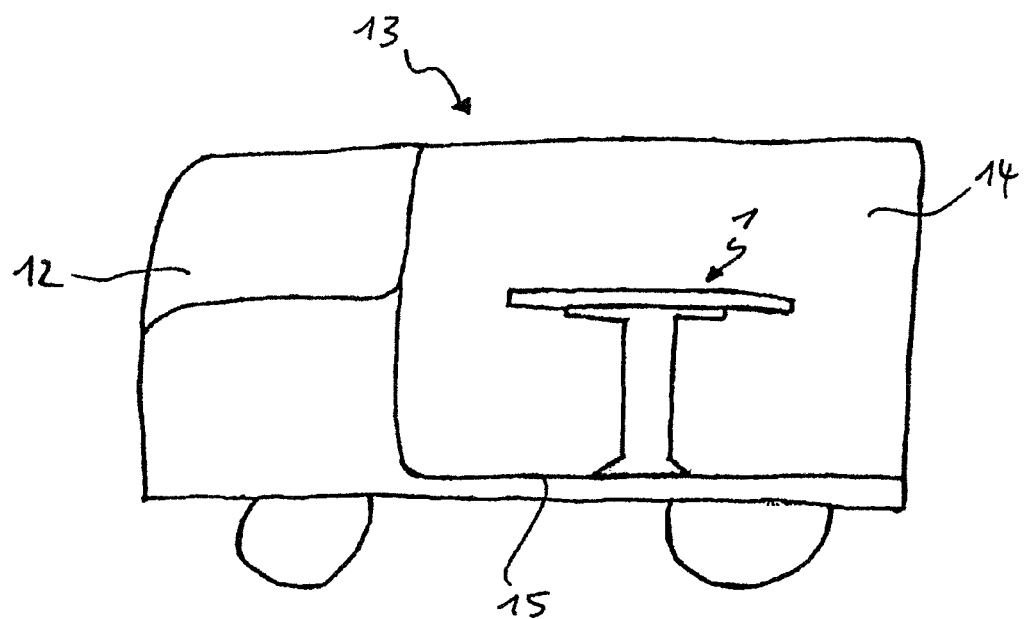
FIG. 6 is a schematic representation of a camper, in which a table according to the present invention is arranged.

FIG. 6 shows a camper, mobile home or similar travel or recreational vehicle 13, comprising a living area 14 and a driver area 12.

It is furthermore shown that the camper 13 comprises a floor 15. Furthermore, the table 1 is shown (see, e.g., FIG. 2), which is arranged on the floor 15. It is provided here in particular that the floor 15 comprises a metallic surface at least in a partial region, by means of which the table 1 can be releasably secured to the floor 15.

Hence, a securing of the table 1 to the floor 15 can occur in that a securing mechanism (see, e.g., FIG. 4), which has magnetic properties, interacts with a metallic surface in the floor 15. The metallic surface may be considered to be tantamount to a magnetically active surface.

Consequently, it may be provided that the floor 15 may comprise a magnetically active surface. Furthermore, it may be provided that the driver area 12, and/or the living area 14 may comprise a magnetically active surface, on which or to which the table 1 or an item of furniture 24 can be secured.

Consequently, a releasable securing of the table 1 or the item of furniture in the camper 13 is made possible in that the floor 15 comprises a magnetically active surface, which interacts with the securing mechanism in the support member (see FIG. 4), wherein in the case of the table the support member likewise has magnetic properties.

Of course, heed must be paid to correspondingly suitable magnetic polarity of the securing mechanism and the floor 15.

Figure 7:
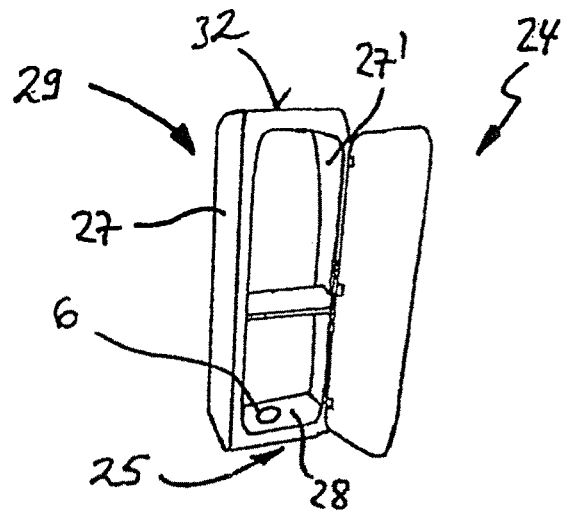
FIG. 7 is a schematic representation of an item of furniture according to the present invention.

FIG. 7 shows an item of furniture 24 according to the present invention in a schematic representation. The item of furniture 24 comprises lateral elements 27, 27' which form a carcass 29, a top element 32 and a bottom element 28. Further, the item of furniture 24 comprises a securing mechanism 6 having magnetic properties. In the exemplary embodiment, the item of furniture 24 is designed as a cabinet.

The securing mechanism 6 in the exemplary embodiment is arranged at the lower end 25 and inside the carcass 29. Thus, the securing mechanism 6 is not visible from the outside, protected against damage, and arranged near the floor, so that the item of furniture can be fastened with sufficient securing force to the floor (see, e.g., FIG. 8).

Figure 8:
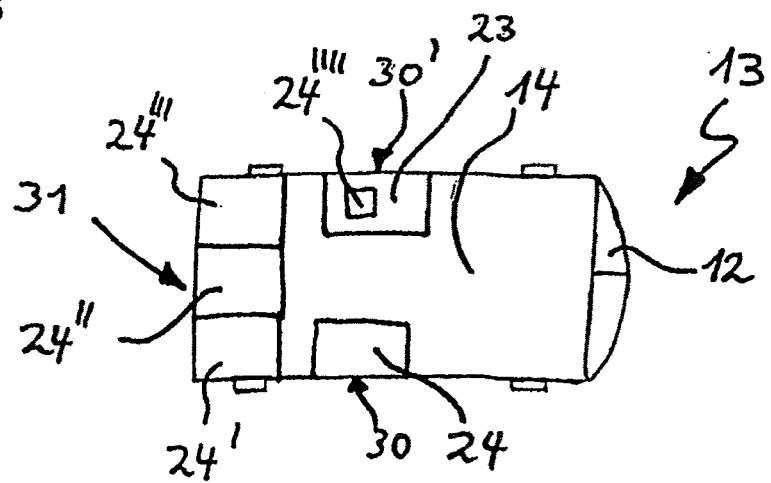
FIG. 8 is a schematic top view of items of furniture according to the present invention and their arrangement in a camper.
Figure 9:
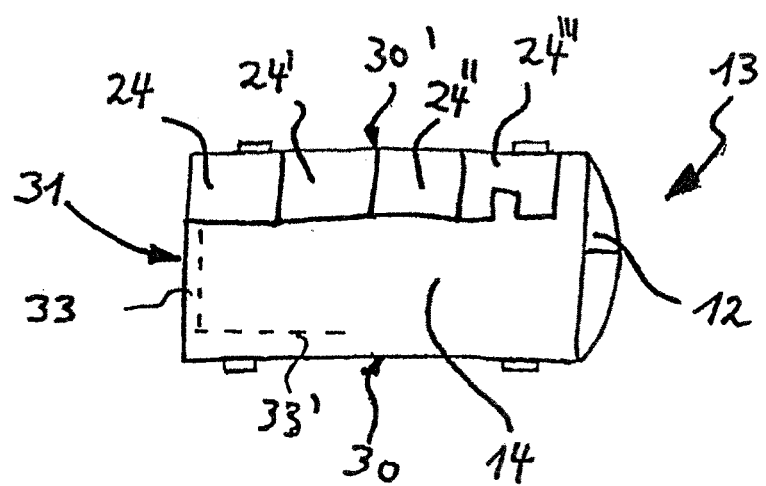
FIG. 9 is a further schematic top view of items of furniture according to the present invention and their arrangement in a camper.

In FIGS. 8 and 9, schematic top views of items of furniture and their arrangements in a camper, mobile home, etc. 13 are shown. It is possible for items of furniture 24, 24', 24", 24"', 24"" to be arranged in the rear area 31 (see FIG. 8), at side areas 30, 31', or in a bathroom area 23 of the camper, mobile home 13, etc. (see FIG. 9).

Such different arrangements of items of furniture 24, 24', 24", 24"' and 24"" in the camper, mobile home 13, etc. make possible on the one hand individual uses of the camper. On the other hand, through special arrangement of furniture items 24, 24', 24", 24"', 24"" weight distributions can be realized in the camper, mobile home 13, etc., which may positively influence the driving behavior of the camper, mobile home 13, etc.

In the context of the present invention, it may be provided that the metallic surface is configured as a magnetically active rail 33, 33', as is schematically represented by a broken line in FIG. 9.

LIST OF REFERENCE NUMBERS

1 Table
2 Support member
3 Table top
4 Upper end (of the support member)
5 Lower end (of the support member)
6 Securing mechanism
7 Cavity
8 Current source
9 Activating mechanism
10 Contact surface
11 Covering means
12 Driver area
13 Camper, mobile home or similar travel or recreational vehicle
14 Living area
15 Floor
16 Bottom side (of the table top)
17 Top side (of the table top)
18 Frame
19 Charging device
20 Base
21 Section of the support member
21' Section of the support member
21" Section of the support member
22 Connecting member
23 Bathroom area
24' Item of furniture
24' Item of furniture
24" Item of furniture
24"' Item of furniture
24"" Item of furniture
25 Lower end (of the item of furniture)
27 Side wall
27' Side wall
28 Bottom element
29 Carcass
30 Side area (of the camper, etc.)
30' Side area (of the camper, etc.)
31 Rear area (of the camper, etc.)
32 Top element
33 Rail
33' Rail

The invention claimed is:

1. An item of furniture comprising:
   a carcass;
   at least one of a top element and a bottom element; and
   at least one securing mechanism having magnetic properties and adapted to secure the item of furniture to a floor element,
   wherein the securing mechanism comprises an electromagnet that can be switched on and off by one of a current source composed of a storage battery and at least one activating mechanism, and wherein the securing mechanism is arranged in the carcass and connected to the bottom element.

2. The item of furniture as claimed in claim 1, wherein the item of furniture is a table, wherein the carcass comprises at least one support member of the table, and wherein the at least one top element comprises at least one table top,
   wherein the support member has an upper end and a lower end, and the support member is connected at the upper end to the table top, and
   wherein the securing mechanism is arranged on a lower end of the support member.

3. The item of furniture as claimed in claim 2, wherein the support member has a cavity and the securing mechanism is arranged in the cavity.

4. The item of furniture as claimed in claim 2, wherein an activating mechanism is arranged on and connected to the table top.

5. The item of furniture as claimed in claim 2, wherein the lower end of the support member has a contact surface formed by a magnet or is magnetizable by the magnet.

6. The item of furniture as claimed in claim 2, wherein the support member comprises a plurality of movable sections that enable the table to be height-adjustable.

7. The item of furniture as claimed in claim 2, wherein the table top comprises at least one current-carrying connecting member.

8. A vehicle comprising:
   at least one of a living area and a bathroom area, each provided with a floor; and at least one item of furniture according to claim 1, arranged in at least one of the living area and in the bathroom area, wherein at least a part of the floor has at least one metallic surface area, whereby the item of furniture is magnetically secured to the floor in a releasable manner.

9. The item of furniture according to claim 2, wherein the support member is a table leg.

* * * * *